US009867132B2

(12) United States Patent
Haik et al.

(10) Patent No.: US 9,867,132 B2
(45) Date of Patent: *Jan. 9, 2018

(54) PREDICTION FOR POWER CONSERVATION IN A MOBILE DEVICE

(71) Applicant: MICROSOFT TECHNOLOGY LICENSING, LLC, Redmond, WA (US)

(72) Inventors: Fadi Haik, Shafaram (IL); Adi Ben-Dayan, Rishon Lezion (IL); Or Kaplan, Tel Aviv (IL); Gilad Oren, Tel Aviv (IL); Eran Yariv, Zichron Yaakov (IL)

(73) Assignee: Microsoft Technology Licensing, LLC, Redmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/233,699

(22) Filed: Aug. 10, 2016

(65) Prior Publication Data

US 2016/0353383 A1    Dec. 1, 2016

Related U.S. Application Data

(63) Continuation of application No. 13/551,613, filed on Jul. 18, 2012, now Pat. No. 9,442,181.

(51) Int. Cl.
*H04M 1/00* (2006.01)
*H04W 24/00* (2009.01)
(Continued)

(52) U.S. Cl.
CPC ........ *H04W 52/0258* (2013.01); *G01C 21/20* (2013.01); *G01S 5/0018* (2013.01);
(Continued)

(58) Field of Classification Search
CPC ....... H04W 4/02–4/046; H04W 4/185; H04W 4/206; H04W 8/10–8/245;
(Continued)

(56) References Cited

U.S. PATENT DOCUMENTS 6,078,826 A    6/2000 Croft et al.
7,200,394 B2    4/2007 Aoki et al.
(Continued)

FOREIGN PATENT DOCUMENTS

CN    101251589 A    8/2008
EP    2293016 A2    3/2011
(Continued)

OTHER PUBLICATIONS

"Final Office Action Issued in U.S. Appl. No. 13/551,613", dated Mar. 11, 2015, 15 Pages.
(Continued)

*Primary Examiner* — San Htun
(74) *Attorney, Agent, or Firm* — Shook, Hardy & Bacon, LLP

(57) ABSTRACT

Architecture that facilitates power conservation in mobile devices such as cell phones using prediction. The architecture is an algorithmic-based solution that transforms infrequently-captured geolocation data of an entity into a continuous probable location approximation. Given the location history and additional data about the recent location of the mobile device, the current location of the device can be estimated with some probability. Additionally, given the location history and additional data about the recent location of the device, the probability of the device actually being at a given point on a map is computed.

12 Claims, 6 Drawing Sheets

(51) Int. Cl.
| | |
|---|---|
| *H04W 52/02* | (2009.01) |
| *G01S 5/02* | (2010.01) |
| *G01S 5/00* | (2006.01) |
| *G01C 21/20* | (2006.01) |
| *H04W 4/04* | (2009.01) |
| *H04W 4/02* | (2009.01) |
| *H04W 4/20* | (2009.01) |
| *H04W 64/00* | (2009.01) |
| *H04W 48/04* | (2009.01) |

(52) U.S. Cl.
CPC .......... *G01S 5/0257* (2013.01); *G01S 5/0278* (2013.01); *H04W 4/028* (2013.01); *H04W 4/046* (2013.01); *H04W 52/02* (2013.01); *H04W 52/0251* (2013.01); *H04W 52/0254* (2013.01); *G01S 5/0294* (2013.01); *H04W 4/02* (2013.01); *H04W 4/206* (2013.01); *H04W 48/04* (2013.01); *H04W 64/00* (2013.01); *Y02B 60/50* (2013.01)

(58) Field of Classification Search
CPC .... H04W 64/00–64/006; H04W 88/02–88/06; H04W 92/00; H04W 92/04; H04W 92/08; H04W 92/10
See application file for complete search history.

(56) References Cited

U.S. PATENT DOCUMENTS

| | | | |
|---|---|---|---|
| 7,565,157 | B1 | 7/2009 | Ortega et al. |
| 7,962,156 | B2 | 6/2011 | Robertson et al. |
| 8,228,234 | B2 | 7/2012 | Paulson et al. |
| 8,433,334 | B2 | 4/2013 | Huang et al. |
| 8,639,803 | B2 | 1/2014 | Moritz et al. |
| 8,981,995 | B2 | 3/2015 | Schlesinger et al. |
| 2004/0158584 | A1* | 8/2004 | Necsoiu ............ G06F 17/30241 |
| 2007/0042790 | A1 | 2/2007 | Mohi et al. |
| 2007/0073832 | A1 | 3/2007 | Curtis et al. |
| 2008/0070593 | A1* | 3/2008 | Altman ................. H04L 63/102 455/457 |
| 2008/0104225 | A1 | 5/2008 | Zhang et al. |
| 2008/0268870 | A1 | 10/2008 | Houri |
| 2008/0311947 | A1 | 12/2008 | Soerensen et al. |
| 2009/0098903 | A1* | 4/2009 | Donaldson ............ G01S 19/258 455/552.1 |
| 2009/0143082 | A1* | 6/2009 | Begeja ................ H04L 63/0428 455/456.6 |
| 2010/0070334 | A1 | 3/2010 | Monteverde |
| 2010/0082247 | A1 | 4/2010 | Klein et al. |
| 2010/0231383 | A1 | 9/2010 | Levine et al. |
| 2010/0255856 | A1 | 10/2010 | Kansal et al. |
| 2010/0272426 | A1* | 10/2010 | Huliyapur Math .... G03B 17/24 396/310 |
| 2010/0323715 | A1 | 12/2010 | Winters |
| 2011/0151839 | A1* | 6/2011 | Bolon .................... H04W 24/08 455/414.1 |
| 2011/0208430 | A1 | 8/2011 | Tun et al. |
| 2011/0319094 | A1 | 12/2011 | Usui et al. |
| 2012/0054337 | A1 | 3/2012 | Moritz et al. |
| 2012/0158289 | A1 | 6/2012 | Bernheim Brush et al. |
| 2012/0301103 | A1* | 11/2012 | Cazier .................. H04N 9/8205 386/239 |

FOREIGN PATENT DOCUMENTS

| | | |
|---|---|---|
| JP | 2003215228 A | 7/2003 |
| JP | 2007088943 A | 4/2007 |
| JP | 2011119784 A | 6/2011 |
| WO | 2009016505 A2 | 2/2009 |

OTHER PUBLICATIONS

"Non Final Office Action Issued in U.S. Appl. No. 13/551,613", dated Jul. 16, 2015, 11 Pages.

"Non Final Office Action Issued in U.S. Appl. No. 13/551,613", dated Aug. 13, 2014, 10 Pages.

"Notice of Allowance Issued in U.S. Appl. No. 13/551,613", dated Jun. 6, 2016, 7 Pages.

"Office Action Issued in European Patent Application No. 13748129.7", dated Dec. 23, 2016, 6 Pages.

Wei et al., "PATS: A Framework of Pattern-Aware Trajectory Search", In Eleventh International Conference on Mobile Data Management, May 23, 2010, pp. 372-377.

Amin, et al., "Fancy a Drink in Canary Wharf?: A User Study on Location-Based Mobile Search", In Proceedings of the 12th IFIP TC 13 International Conference on Human-Computer Interaction: Part I, Aug. 24, 2009, 14 Pages.

Ashbrook, et al., "Using GPS to Learn Significant Locations and Predict Movement Across Multiple Users", In Proceedings of Personal and Ubiquitous Computing, vol. 7, Issue 5, Oct. 1, 2003, 15 Pages.

Dissanayake, et al., "A Solution to the Simultaneous Localization and Map Building (SLAM) Problem", In Proceedings of IEEE Transactions on Robotics and Automation, vol. 17, Issue 3, Jun. 2001, pp. 229-241.

Liu, et al., "Location Awareness through Trajectory Prediction", In Journal Computers, Environment and Urban Systems, vol. 30, Issue 6, 2006, Nov. 2006, pp. 741-756.

"International Search Report & Written Opinion Issued in PCT Application No. PCT/US2013/050963", dated Nov. 8, 2013, 14 Pages.

"Office Action Issued in European Patent Application No. 13748129.7", dated Sep. 25, 2017, 7 Pages.

\* cited by examiner

PREDICTION FOR POWER CONSERVATION IN A MOBILE DEVICE

CROSS-REFERENCE TO RELATED APPLICATIONS

This application is a continuation of U.S. patent application Ser. No. 13/551,613, filed Jul. 18, 2012, and titled "PREDICTION FOR POWER CONSERVATION IN A MOBILE DEVICE," the entirety of which is hereby incorporated by reference.

BACKGROUND

As location becomes an ever growing component in many personal services (e.g., geo-fencing, automated check-ins, location-based-advertisements, realtime social location sharing, etc.), the technology behind collecting, distributing, and acting on location updates still suffers from technological limitations. One of the most evident limitations is reduced battery life.

In the context of a cell phone, continuous location sampling currently requires an active microprocessor state on the phone. This in turn prevents the phone from entering a deep sleep state and blocks the advanced power saving options from engaging. This is true even if Wi-Fi hotspots or cell-tower ID triangulation is used instead of GPS.

Furthermore, many scenarios require that the user's location be transmitted to a web service (e.g., group location sharing, find my phone, dynamic query geo-fencing, etc.). In these cases, even radical hardware-based power improvements to the location acquisition on the device will not remove the need to establish an ongoing or frequent connection. These connections, using either cellular or Wi-Fi technologies, inflict yet another considerable power drain on the mobile device.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture facilitates power conservation in mobile devices such as cell phones using prediction. The architecture is an algorithmic-based solution that transforms infrequently-captured location data of an entity into a continuous probable location approximation. Given the location history and additional data about the recent location of the mobile device, the current location of the device can be estimated with some probability. Additionally, given the location history and additional data about the recent location of the device, the probability of the device actually being at a given point on a map is computed.

More specifically, a navigation (map) application of a mobile device of a first user accesses location updates of a second user (as received from a second mobile device of the second user. The location updates of the second user are periodically stored on a network (in a realtime update storage service) for access by the mobile device.

A prediction component of the mobile device operates locally (in the mobile device) to predict (estimate) a realtime geographical location of the second user based on processing of a location update of the second user (stored at the storage service). The predication component facilitates power conservation in the mobile device by waiving access to (not accessing) the network (and hence, the storage service) for new location updates of the second user.

Since the prediction component estimates the realtime geographical location of the second user based on the previously-uploaded location update, as obtained related to a prior geographical location, no network access is required to the storage service—the mobile device may enter a power conservation mode for a predetermined amount of time (e.g., twenty minutes) before accessing a next location update of the second user, thereby extending the battery life of the power subsystem of the mobile device.

The architecture operates to share user locations among many users who choose to enable location sharing. Thus, each user device executes a similar (compatible) map application that displays the locations of the other users on a map. Each user device uploads updates as metadata, rather than geographical coordinates (geolocation information) in a continuous manner, as in conventional approaches, although geographical coordinates can be part of the update. The metadata includes speed and vector data. For example, if a given user travels along a given vector (route) at an approximately constant speed, it can be inferred that the user will stay on the route for some estimated time (e.g., minutes). Thus, a continuous location update technique is not warranted, and the device can conserve power until the next time to read an update from the network service.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
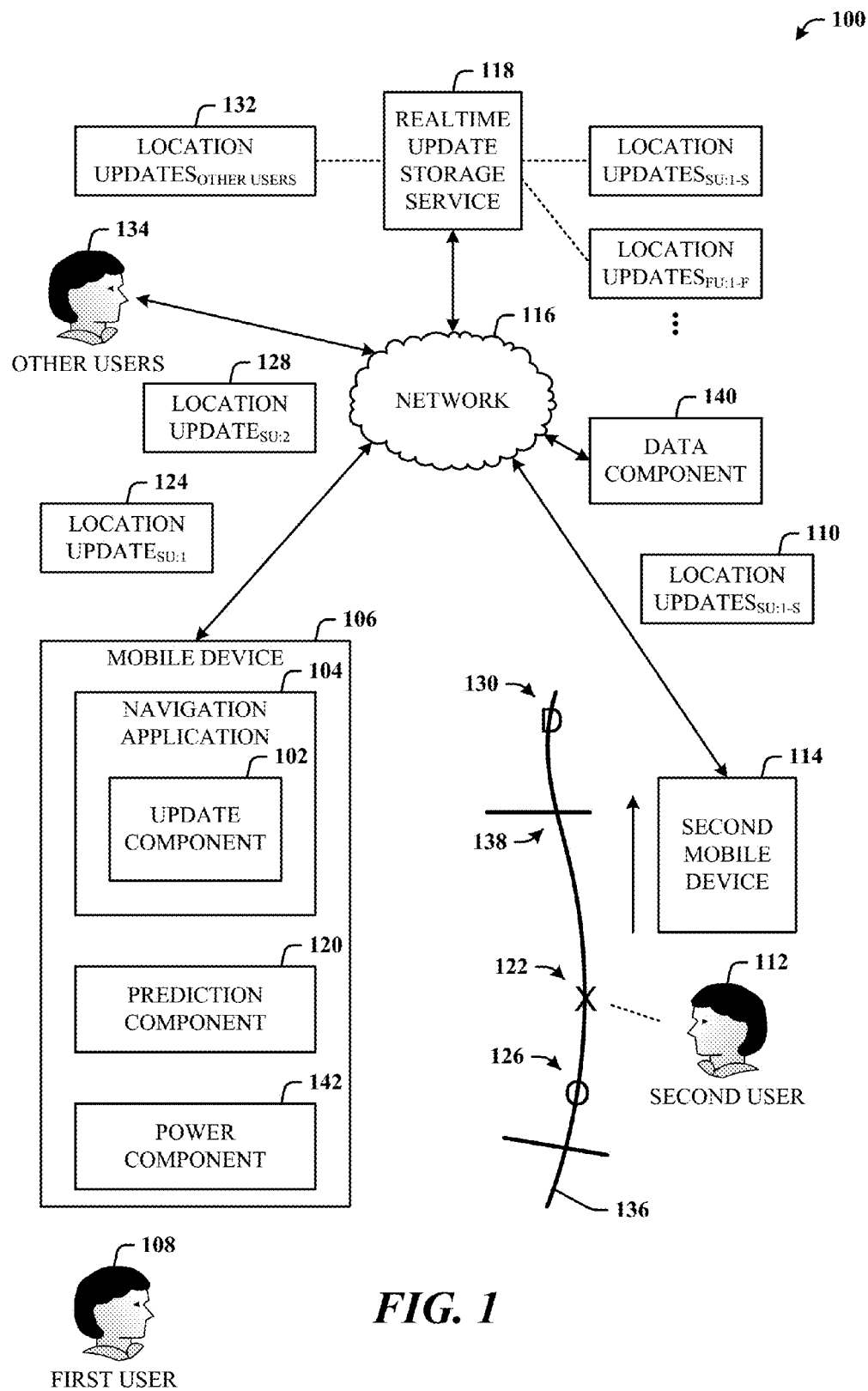
FIG. 1 illustrates a system in accordance with the disclosed architecture.

The disclosed architecture facilitates power conservation in mobile devices such as cell phones using prediction. The architecture is an algorithmic-based solution that transforms infrequently-captured location data of an entity into a continuous probable location approximation. Given the location history and additional data about the recent location of the mobile device, the current location of the device can be estimated with some probability. Additionally, given the location history and additional data about the recent location of the device, the probability of the device actually being at a given point on a map is computed.

The architecture employs a life-log, which can be a personally identifiable information (PII) store where personal location data can be stored and retrieved. As described herein, this is referred to as a network-based realtime update storage service that stores PII data for many users and makes this data accessible by authorized users. This service provides unique user identification and support methods to store and query data from a web service interface. Additionally, the service can include extracted semantics—for example, the location of a user's home, office, gym, etc. The semantics can further include references to other users in the immediate family (e.g., spouse, siblings, etc.).

A set of code runs on a mobile device which enables periodic location sampling from the network service and the communication of updates for a given user to the life-log with signals for that user. Additionally, this code can collect more signals which help predict a second user's location as described above. These signals can include its Bluetooth™ neighborhood, accelerometer data, calendar data, and check-in history (e.g., at businesses), for example.

The architecture can also employ additional data (a data component) to assist in prediction of another user's location for power conservation of onboard standalone power sources (e.g., batteries). The additional data includes, but is not limited to, live (realtime) traffic data (e.g., construction zones, rush hour speeds, locations of congestion, etc.), as well as environmental conditions (e.g., wind, rain, flooding, temperature, altitude, etc.). The additional data (the data component) can also include topology data for roads and terrain, for example. Road topology can be converted to vector data utilized for roadmap reckoning methods.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 can include an update component 102 of a navigation (map) application 104 of a mobile device 106 of a first user 108 that accesses location updates 110 (denoted LOCATION UPDATES$_{SU:1-S}$, for S updates of the second user (SU)) of a second user 112 (as received from a second mobile device 114 of the second user 112). The location updates 110 of the second user 112 are periodically stored on a network 116 (in a realtime update storage service 118) for access by the mobile device 106.

A prediction component 120 of the mobile device 106 operates locally (in the mobile device 106) to predict (estimate) a realtime geographical location 122 of the second user 112 based on processing of a location update 124 (of the location update 110 at the storage service 118) of the second user 112. The predication component 120 facilitates power conservation in the mobile device 106 by waiving access to (not accessing) the network 116 (and hence, the storage service 118) for new location updates of the second user 112.

Since the prediction component 120 estimates the realtime geographical location 122 of the second user 112 based on the previously-uploaded location update 124, as obtained related to a prior geographical location 126, no network access is required to the storage service 118—the mobile device 106 may enter a power conservation mode for a predetermined amount of time (e.g., twenty minutes) before accessing a next location update 128 of the second user 112, thereby extending the battery life of the power subsystem of the mobile device 106.

It is to be understood that the second mobile device 114 of the second user 112 can also include the disclosed architecture to facilitate power conservation and prediction, as described relative to the mobile device 106.

The location updates 110 can include geographical coordinates (e.g., via global positioning system, (GPS)) of the prior location 126 of the second user 112, and metadata comprised of speed information (e.g., the current speed, the average speed, etc.) and navigation vector of the second user 112, or a combination of both.

The prediction component 120 can predict the realtime geographical point 122 of the second user 112 based on a destination 130 of the second user 112. The prediction component 120 can predict the realtime geographical point 122 of the second user 112 based on some or all of the historical location updates 110 of the second user 112. The prediction component 120 can predict the geographical point 122 of the second user 112 based on location updates 132 of other users 134. The prediction component 120 predicts the geographical point 122 of the second user 112 based on location updates 110 and information from a map (navigation) application (similar to the navigation application 104 running on the mobile device 106 of the first user 108) of the second user 112.

The location update of the second user 112 to the network 116 is not performed when the second user 112 travels along a same vector and at an approximately constant speed. The location update of the second user 112 to the network 116 (and hence, the storage service 118) is not performed when the second user 112 maintains travel on a road 136 of a map without departure therefrom. The location update of the second user 112 to the network 116 is performed when the second user 112 arrives at a specific type of geographical point (e.g., an intersection 138).

The system 100 can further comprise a data component 140 that obtains traffic data and road topology vector data for processing by the prediction component 120 to predict the realtime geographical point 122.

A power component 142 of the mobile device includes the power subsystem (e.g., batteries, AC interface for line power, etc.), as well as the differing degrees of power modes such as off, on, sleep, power conservation mode, etc., that can be managed based on prediction.

Figure 2:
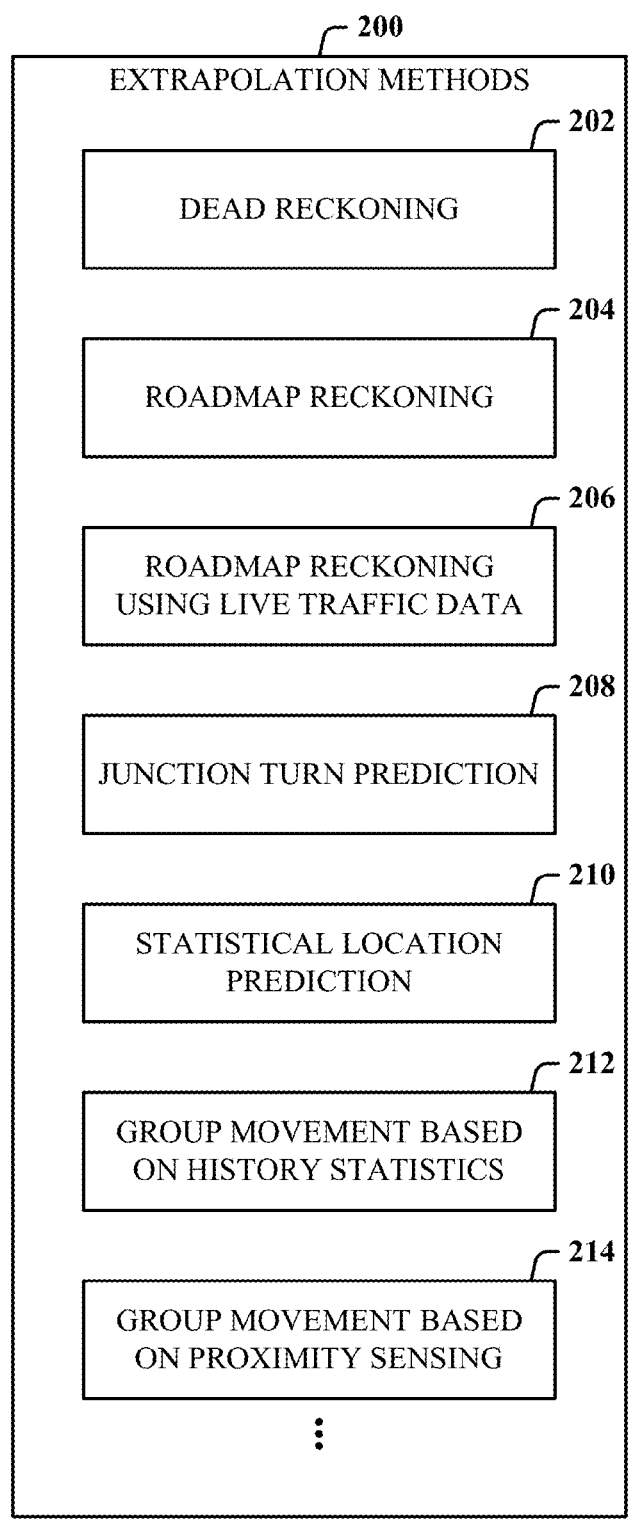
FIG. 2 illustrates exemplary extrapolation methods that can be employed to assist in power conservation by prediction.

FIG. 2 illustrates exemplary extrapolation methods 200 that can be employed to assist in power conservation by prediction. When using a background agents API (application program interface) in a mobile device, an application can derive geolocation coordinates with a constant frequency (e.g., every twenty minutes) and opportunistically upload its location to a web service. However, by itself, this twenty-minute frequency may be too sparse for realtime location sharing applications. By using prediction, the location of the user can be extrapolated from statistical information and recent readings. This enables a connect-the-dots location approximation, and a perception of continuous location sensing and updating while, in fact, the mobile device (e.g., cell phone) is only updating its location once every twenty minutes, thereby significantly improving power conservation in the device.

Several methods for location extrapolation can be employed, including, but not limited to, dead reckoning 202, roadmap reckoning 204, roadmap reckoning with live traffic data 206, junction turn prediction 208, statistical location prediction 210, group movement based on history statistics 212, and group movement based on proximity sensing 214. These and other different methods can be employed solely or in combination to one another.

With respect to dead reckoning 202 extrapolation, the navigation application plots a user location at one position, and using course and speed, estimates the user location at later points in time. With respect to roadmap reckoning 204, the user was last seen on a given road heading west at a given speed. Given the road topology, the user location can be predicted a predetermined time later (e.g., one minute).

Roadmap reckoning with live traffic data 206 is similar to roadmap reckoning, but takes into consideration live traffic data and modifies the travel speed accordingly. Junction turn prediction 208 considers all possible turning points along a route and the likelihood that a given user will turn using any one of these junctions. For example, on Wednesday at 10:30 AM, the user was detected traveling at 40 MPH on a highway. In four minutes, the user will approach the next exit. Statistically, the user took that exit a high percentage (e.g., 95%) of the times during previous travel on that road in the past two months and during weekdays. Therefore, it can be predicted with a 95% chance that the user will again take this exit.

Statistical location predication 210 ignores the road topology and looks at a statistical graphical representation (e.g., a heatmap) of the user's location history. Factors considered include weekday/weekend or daytime/nighttime, and deduction of the most probable place the user can be. For example, it is a Tuesday at noon and not a holiday, so the user is probably at the office.

Group movement based on history statistics 212 takes into account other people in the user's proximity. For example, the user last reported his location (sent a location update) fourteen minutes ago, but a second user reported its location three minutes ago. By looking at the user's calendar, it can be determined that the user and the second user are scheduled to be in a meeting for the past hour. It can then be deduced that the second user's recent location applies to the user as well.

In addition to calendar data, data such as check-ins, meet-ups, and other indications of proximity can be considered. This can also be enhanced by using statistical location prediction. If it is known that the second user is the user's wife and the time is now 11:30 PM, it can be assumed that the user is at the second user's home location, even before obtaining sufficient data to deduce the user's home location.

Group movement based on proximity sensing 214 employs proximity sensors to automatically detect which users are close to each other. Proximity sensors can be methods such as Bluetooth or NFC (near-field communications). For example, a user's cell phone reported its location two minutes ago. The cell phone also reported all of the visible Bluetooth devices it can detect. One of these devices is a second user's cell phone. Hence, it can be deduced that the user is near the second user and that the second user's location as of two minutes ago.

If enough people are around, their cellphone location reporting periods can be timed in a way that gets the most coverage by taking shifts. For example, as long as users A, B, C, and D are in the same proximity (e.g., they can transitively detect each other's Bluetooth IDs), the location updates timing can be set so that user A reports its location at (hh:00, hh:20, hh:40), user B reports its location five minutes later at (hh:05, hh:25, hh:45), user C reports its location five minutes later at (hh:10, hh:30, hh:50), and user D reports its location five minutes later at (hh:15, hh:35, hh:55). Thus, the effective location frequency can be increased from twenty minutes to five minutes without exhausting the mobile devices beyond the normal twenty minute reporting frequency.

Figure 3:
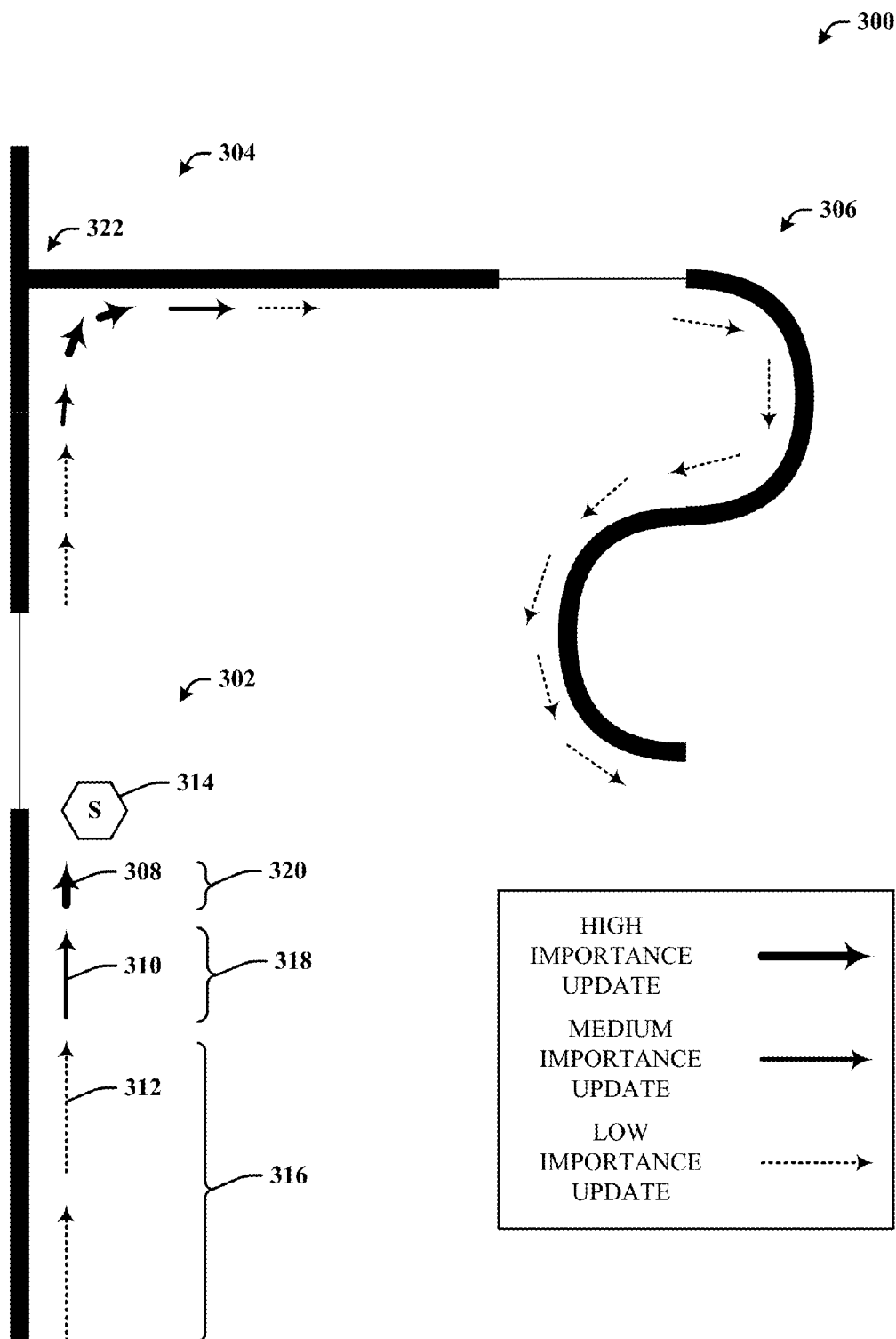
FIG. 3 illustrates a set of roadmap instances where updates are processed at different levels of location update criteria.

FIG. 3 illustrates a set of roadmap instances 300 where updates are processed at different levels of location update criteria. The instances 300 include three road topographies along with vectors, which indicate three levels of location update importance: a first instance 302 of a relatively straight road, a second instance 304 that includes a junction (or intersection), and a third instance 306 of a curvy road. The importance vectors are characterized as arrows of varying thickness and line pattern, as in the following: a high importance update vector 308 is depicted as the thickest solid black line of the lines shown, terminated on one end with an arrow; a medium importance update vector 310 is depicted as narrower in thickness than the solid black line of the vector 308; and, the low importance update vector 312 is the thinnest with a dotted line. The arrows indicate the direction of travel along the roads, and the length of each vector indicates the time between updates. For example, low importance update vector 312 updates less frequently than the high importance update vector 308. This also means that power conservation is in force on the device during these vector lengths, as facilitated by prediction (estimation).

The first instance 302 illustrates slowdown and stop vectors on this roadway. As the user travels on the same road and at a relatively constant speed to a stopping/slowdown point 314 (e.g., a stop sign, a roundabout, traffic light, etc.), the location update vectors vary in importance and length, as facilitated by prediction, thereby impacting the power needs of the device. For example, in the road section 316, which is away from the stopping/slowdown point 314, user velocity appears to be constant (the vector lengths are approximately the same) and the user stays on the same road. This, it can be predicted that the user will travel on the same road, and thus in this example, only require the device power to send two location updates to the network service 118 over that distance. Additionally, it can be determined from road topology data that continuing on this road for some distance will bring the user to the stopping/slowdown point 314. Accordingly, the number of location updates (metadata) desired can be computed beforehand and executed as a plan along the route provided the user travels within the plan parameters (e.g., constant speed, no stops, no traffic slowdowns, no accidents, etc.). Thus, the uploaded metadata samples include a speed and the location vector data for two samples.

As the user gets closer to the stopping/slowdown point 314, in the road section 318, the user speed reduces and the updating process elevates to the medium importance update 310. Thus, the uploaded metadata includes a reduced speed and the location vector data, and the duration of the vector 310 is smaller, so the device power conservation time is reduced.

If reaching the stopping/slowdown point 314 is imminent, in the road section 320, the user speed reduces further and the updating process elevates to the high importance update 308. Thus, the uploaded metadata includes a further reduced speed and the location vector data, and the duration of the vector 308 is smaller, so the device power conservation time is further reduced.

The second instance 304 illustrates a vector change near a turn (intersection). As the user is distant from the turn 322, and travels the same road (vector direction), the update metadata includes two low importance vectors and speed data. Thus, the user device can conserve power via prediction. As the user approaches the turn 322 the location update vectors vary in importance, direction, and length, sending more frequent updates (although not continuously) thereby consuming more power in the device. For example, as the user reduces speed, a metadata update can be sent. As the user begins the turn and the vector direction changes, a metadata update can be sent. As the turn completes and the vectors follow a common direction (heading to the right), the number of metadata updates can be reduced as the important level is lowered, as facilitated by prediction.

The third instance 306 illustrates a vector change with no near turns. Based on map topologies, it can be known that no turns exist in this section of road. Thus, although vector direction may change, the speed may be relatively constant, and thus, metadata updates are infrequent, based on prediction. The device can enter power conservation mode frequently due to the infrequent updates to the network service 118.

The disclosed architecture can further employ a security component (not shown) for authorized and secure handling of user information. The security component allows the subscriber to opt-in and opt-out of exposing location information as well as personal information. The user can be provided with notice of the collection of personal information, for example, and the opportunity to provide or deny consent to do so. Consent can take several forms. Opt-in consent imposes on the user to take an affirmative action before the data is collected. Alternatively, opt-out consent imposes on the user to take an affirmative action to prevent the collection of data before that data is collected.

The security component also allows the user to access and update profile information. For example, the user can view the personal and/or location data that has been collected, and provide corrections. Where sensitive personal information such as schedules, homes, family, etc., and financial information can be tracked and obtained, the security component ensures that the data is housed (in the storage service 118) using security measures appropriate for the sensitivity of the data.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
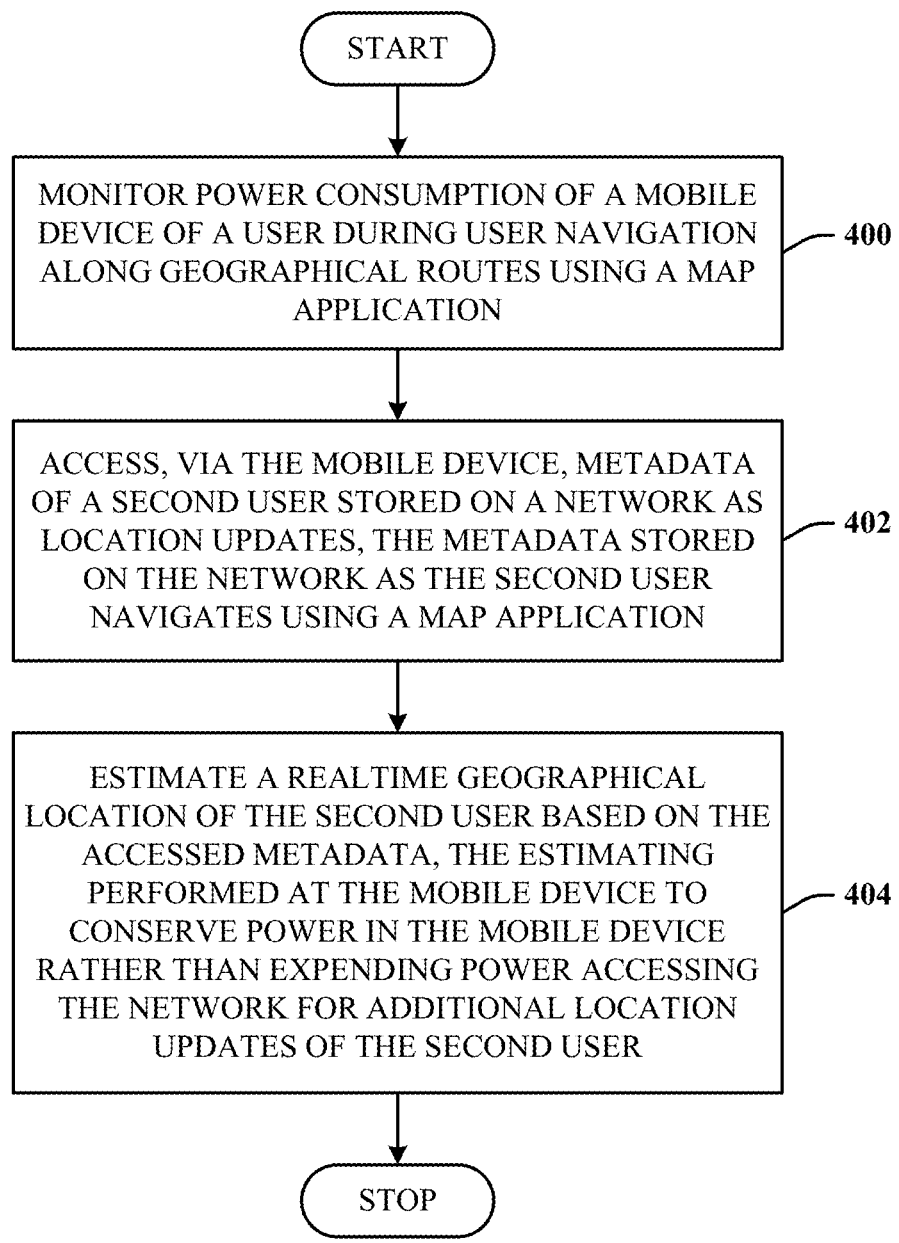
FIG. 4 illustrates a method in accordance with the disclosed architecture.

FIG. 4 illustrates a method in accordance with the disclosed architecture. At 400, power consumption of a mobile device of a user is monitored during user navigation along geographical routes using a map application. At 402, metadata of a second user stored on a network as location updates is accessed via the mobile device. The metadata is stored on the network and accessed as the second user navigates using a map (navigation) application. At 404, a realtime geographical location of the second user is estimated based on the accessed metadata. The estimation is performed at the mobile device to conserve power in the mobile device rather than expending power accessing the network for additional location updates of the second user.

The acts of monitoring, accessing, and estimating are performed as operations transparent to the user (background operations). The geographical location is estimated based on samples of geolocation data of other users or based on previous geolocation data of the second user. The geographical location of the second user is estimated based on location and map information of the second user, or based on a destination of the second user.

Figure 5:
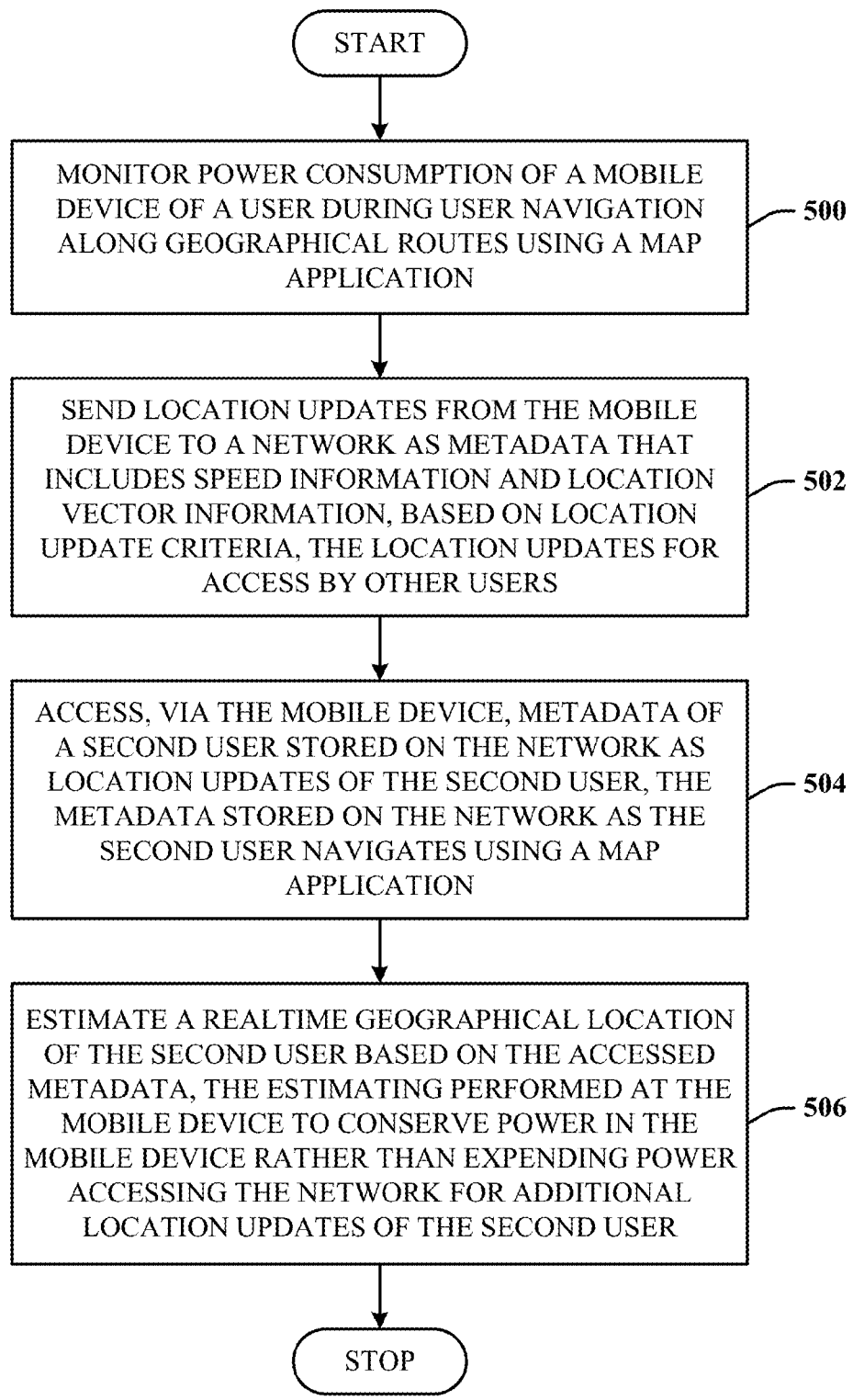
FIG. 5 illustrates an alternative method in accordance with the disclosed architecture.

FIG. 5 illustrates an alternative method in accordance with the disclosed architecture. At 500, power consumption of a mobile device of a user is monitored during user navigation along geographical routes using a map application. At 502, location updates are sent from the mobile device to a network as metadata that includes speed information and location vector information, based on location update criteria, the location updates for access by other users. At 504, metadata of a second user stored on the network as location updates of the second user is accessed via the mobile device. The metadata is stored on the network as the second user navigates using a map application. At 506, a realtime geographical location of the second user is estimated based on the accessed metadata. The estimating performed at the mobile device to conserve power in the mobile device rather than expending power accessing the network for additional location updates of the second user.

Additional acts of the method can include sending a location update from the mobile device to the network for access by the other users when the location update criteria indicates the user is approaching an intersection, and refraining from sending a location update from the mobile device to the network for access by the other users when the location update criteria indicates the user is maintaining speed along a vector. The method can further comprise refraining from sending a location update from the mobile device to the network for access by the other users when the location update criteria indicates the user is maintaining travel along a same road of a map, and estimating the realtime geographical location of the second user based in part on consideration of live traffic data.

The sending of a location update can be overridden based solely on the update criteria in view of a type of power source of the mobile device. In other words, if the power level of the mobile device is critically low, yet a criterion is to send an update when arriving at an intersection, the metadata update will be sent, even if the time to send an update has yet to be met.

As used in this application, the terms "component" and "system" are intended to refer to a computer-related entity (e.g., portable computers, mobile devices such as cell phones, portable computers, etc.), either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 6:
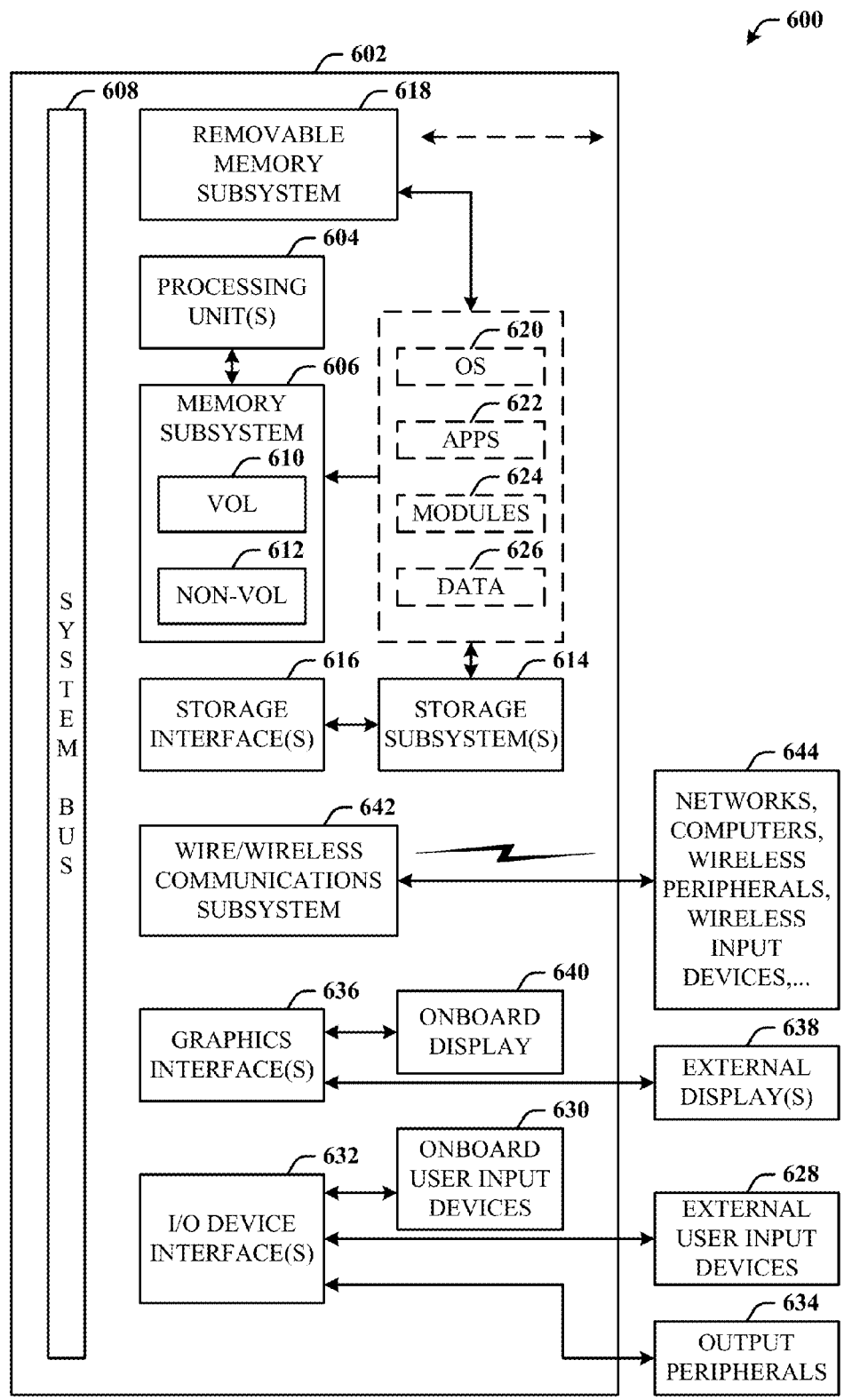
FIG. 6 illustrates a block diagram of a computing system that executes power conservation by prediction in accordance with the disclosed architecture.

Referring now to FIG. 6, there is illustrated a block diagram of a computing system 600 that executes power conservation by prediction in accordance with the disclosed architecture. However, it is appreciated that the some or all aspects of the disclosed methods and/or systems can be implemented as a system-on-a-chip (SoC), where analog, digital, mixed signals, and other functions are fabricated on a single chip substrate. Moreover, the disclosed architecture finds application to mobile devices such as cell phones, which can include hardware and/or software similar to that which is described herein with respect to the computing system 600, such as a SoC, for example.

In order to provide additional context for various aspects thereof, FIG. 6 and the following description are intended to provide a brief, general description of the suitable computing system 600 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 600 for implementing various aspects includes the computer 602 having processing unit(s) 604, a computer-readable storage such as a system memory 606, and a system bus 608. The processing unit(s) 604 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 606 can include computer-readable storage (physical storage media) such as a volatile (VOL) memory 610 (e.g., random access memory (RAM)) and non-volatile memory (NON-VOL) 612 (e.g., ROM, EPROM, EEPROM, etc.). A basic input/output system (BIOS) can be stored in the non-volatile memory 612, and includes the basic routines that facilitate the communication of data and signals between components within the computer 602, such as during startup. The volatile memory 610 can also include a high-speed RAM such as static RAM for caching data.

The system bus 608 provides an interface for system components including, but not limited to, the system memory 606 to the processing unit(s) 604. The system bus 608 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 602 further includes machine readable storage subsystem(s) 614 and storage interface(s) 616 for interfacing the storage subsystem(s) 614 to the system bus 608 and other desired computer components. The storage subsystem(s) 614 (physical storage media) can include one or more of a hard disk drive (HDD), a magnetic floppy disk drive (FDD), and/or optical disk storage drive (e.g., a CD-ROM drive DVD drive), for example. The storage interface(s) 616 can include interface technologies such as EIDE, ATA, SATA, and IEEE 1394, for example.

One or more programs and data can be stored in the memory subsystem 606, a machine readable and removable memory subsystem 618 (e.g., flash drive form factor technology), and/or the storage subsystem(s) 614 (e.g., optical, magnetic, solid state), including an operating system 620, one or more application programs 622, other program modules 624, and program data 626.

The operating system 620, one or more application programs 622, other program modules 624, and/or program data 626 can include entities and components of the system 100 of FIG. 1, the methods 200 of FIG. 2, the instances 300 of FIG. 3, and the methods represented by the flowcharts of FIGS. 4 and 5, for example.

Generally, programs include routines, methods, data structures, other software components, etc., that perform particular tasks or implement particular abstract data types. All or portions of the operating system 620, applications 622, modules 624, and/or data 626 can also be cached in memory such as the volatile memory 610, for example. It is to be appreciated that the disclosed architecture can be implemented with various commercially available operating systems or combinations of operating systems (e.g., as virtual machines).

The storage subsystem(s) 614 and memory subsystems (606 and 618) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 602 and includes volatile and non-volatile internal and/or external media that is removable or non-removable. For the computer 602, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 602, programs, and data using external user input devices 628 such as a keyboard and a mouse. Other external user input devices 628 can include a microphone, an IR (infrared) remote control, a joystick, a game pad, camera recognition systems, a stylus pen, touch screen, gesture systems (e.g., eye movement, head movement, etc.), and/or the like. The user can interact with the computer 602, programs, and data using onboard user input devices 630 such a touchpad, microphone, keyboard, etc., where the computer 602 is a portable computer, for example. These and other input devices are connected to the processing unit(s) 604 through input/output (I/O) device interface(s) 632 via the system bus 608, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 632 also facilitate the use of output peripherals 634 such as printers, audio devices, camera devices, and so on, such as a sound card and/or onboard audio processing capability.

One or more graphics interface(s) 636 (also commonly referred to as a graphics processing unit (GPU)) provide graphics and video signals between the computer 602 and external display(s) 638 (e.g., LCD, plasma) and/or onboard displays 640 (e.g., for portable computer). The graphics interface(s) 636 can also be manufactured as part of the computer system board.

The computer 602 can operate in a networked environment (e.g., IP-based) using logical connections via a wired/wireless communications subsystem 642 to one or more networks and/or other computers. The other computers can include workstations, servers, routers, personal computers, microprocessor-based entertainment appliances, peer devices or other common network nodes, and typically include many or all of the elements described relative to the computer 602. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 602 connects to the network via a wired/wireless communication subsystem 642 (e.g., a network interface adapter, onboard transceiver subsystem, etc.) to communicate with wired/wireless networks, wired/wireless printers, wired/wireless input devices 644, and so on. The computer 602 can include a modem or other means for establishing communications over the network. In a networked environment, programs and data relative to the computer 602 can be stored in the remote memory/storage device, as is associated with a distributed system. It will be appreciated that the network connections shown are exemplary and other means of establishing a communications link between the computers can be used.

The computer 602 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. One or more computer-storage hardware memory having computer executable instructions embodied thereon, which when executed, cause a computing device to perform a method, comprising acts of:
   monitoring power consumption of a mobile device of a user during user navigation along geographical routes using a map application;
   sending location updates from the mobile device to a network as metadata that includes speed information and location vector information, based on location update criteria, the location updates for access by other users;
   accessing, via the mobile device, metadata of a second user stored on the network as location updates of the second user, the metadata stored on the network as the second user navigates using a map application;
   estimating a realtime geographical location of the second user based on the accessed metadata, the estimating performed at the mobile device to conserve power in the mobile device rather than expending power accessing the network for additional location updates of the second user; and
   utilizing a microprocessor that executes instructions stored in a memory.

2. The hardware memory of claim 1, further comprising sending a location update from the mobile device to the network for access by the other users when the location update criteria indicates the user is approaching an intersection.

3. The hardware memory of claim 1, further comprising refraining from sending a location update from the mobile device to the network for access by the other users when the location update criteria indicates the user is maintaining speed along a vector.

4. The hardware memory of claim 1, further comprising refraining from sending a location update from the mobile device to the network for access by the other users when the location update criteria indicates the user is maintaining travel along a same road of a map.

5. The hardware memory of claim 1, further comprising estimating the realtime geographical location of the second user based in part on consideration of live traffic data.

6. The hardware memory of claim 1, further comprising overriding the sending of a location update based solely on the update criteria in view of a type of power source of the mobile device.

7. A method, comprising acts of:
   monitoring power consumption of a mobile device of a user during user navigation along geographical routes using a map application;
   sending location updates from the mobile device to a network as metadata that includes speed information and location vector information, based on location update criteria, the location updates for access by other users;
   accessing, via the mobile device, metadata of a second user stored on the network as location updates of the second user, the metadata stored on the network as the second user navigates using a map application;

estimating a realtime geographical location of the second user based on the accessed metadata, the estimating performed at the mobile device to conserve power in the mobile device rather than expending power accessing the network for additional location updates of the second user; and utilizing a microprocessor that executes instructions stored in a memory.

8. The method of claim 6, further comprising sending a location update from the mobile device to the network for access by the other users when the location update criteria indicates the user is approaching an intersection.

9. The method of claim 6, further comprising refraining from sending a location update from the mobile device to the network for access by the other users when the location update criteria indicates the user is maintaining speed along a vector.

10. The method of claim 6, further comprising refraining from sending a location update from the mobile device to the network for access by the other users when the location update criteria indicates the user is maintaining travel along a same road of a map.

11. The method of claim 6, further comprising estimating the realtime geographical location of the second user based in part on consideration of live traffic data.

12. The method of claim 6, further comprising overriding the sending of a location update based solely on the update criteria in view of a type of power source of the mobile device.

* * * * *